United States Patent
Yamagami et al.

(10) Patent No.: US 7,398,302 B2
(45) Date of Patent: Jul. 8, 2008

(54) REMOTE COPY WITH PATH SELECTION AND PRIORITIZATION

(75) Inventors: Kenji Yamagami, Odawara (JP); Shoji Kodama, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 991 days.

(21) Appl. No.: 10/684,221

(22) Filed: Oct. 2, 2003

(65) Prior Publication Data

US 2004/0128363 A1    Jul. 1, 2004

Related U.S. Application Data

(63) Continuation-in-part of application No. 10/022,306, filed on Dec. 14, 2001, now Pat. No. 6,728,849, and a continuation-in-part of application No. 09/823,470, filed on Mar. 30, 2001, now Pat. No. 7,096,269.

(51) Int. Cl.
*G06F 15/16* (2006.01)
(52) U.S. Cl. .................. 709/217; 709/225; 709/226; 709/219; 711/151; 711/158; 711/161
(58) Field of Classification Search ........... 709/203, 709/224, 223, 217, 219, 225, 226; 711/151, 711/158, 161
See application file for complete search history.

(56) References Cited

U.S. PATENT DOCUMENTS

| | | | |
|---|---|---|---|
| 5,459,857 A | 10/1995 | Ludlam et al. | |
| 5,537,533 A | 7/1996 | Staheli et al. | |
| 5,544,347 A | 8/1996 | Yanai et al. | |
| 5,778,165 A | 7/1998 | Saxon | |
| 5,875,479 A | 2/1999 | Blount et al. | |
| 5,889,935 A | 3/1999 | Ofek et al. | |
| 5,909,700 A | 6/1999 | Bitner et al. | |
| 5,933,653 A | 8/1999 | Ofek | |
| 5,937,414 A | 8/1999 | Souder et al. | |
| 5,974,563 A | 10/1999 | Beeler | |
| 5,987,621 A * | 11/1999 | Duso et al. ............. | 714/4 |
| 6,115,784 A | 9/2000 | Dorricott et al. | |
| 6,122,713 A | 9/2000 | Huang et al. | |
| 6,173,377 B1 | 1/2001 | Yanai et al. | |
| 6,189,079 B1 | 2/2001 | Micka et al. | |
| 6,192,281 B1 | 2/2001 | Brown et al. | |
| 6,269,382 B1 | 7/2001 | Cabrera et al. | |
| 6,295,575 B1 * | 9/2001 | Blumenau et al. ....... | 711/5 |
| 6,301,589 B1 | 10/2001 | Hirashima et al. | |
| 6,304,980 B1 * | 10/2001 | Beardsley et al. ....... | 714/6 |
| 6,308,283 B1 | 10/2001 | Galipeau et al. | |

(Continued)

*Primary Examiner*—Nathan J Flynn
*Assistant Examiner*—Mohammad Siddiqi
(74) *Attorney, Agent, or Firm*—Townsend and Townsend and Crew LLP

(57) ABSTRACT

A method for handling a remote copy request in a distributed storage includes providing a plurality of primary volumes within a primary storage system that is coupled to a primary host via a first network, the primary storage system being coupled to a secondary storage system via a second network. A first request is selected from a plurality of requests placed in a queue based on priority information associated with the requests. A first path group is selected from one or more path groups that could be used to transmit the request. The first request is transmitted to the secondary storage system using the first path group, the secondary storage system including a plurality of secondary volumes that are paired to the plurality of primary volumes.

14 Claims, 16 Drawing Sheets

U.S. PATENT DOCUMENTS

| | | |
|---|---|---|
| 6,308,284 B1 | 10/2001 | Lecrone et al. |
| 6,434,681 B1 * | 8/2002 | Armangau .................. 711/162 |
| 6,629,264 B1 * | 9/2003 | Sicola et al. .................. 714/15 |
| 6,684,306 B1 * | 1/2004 | Nagasawa et al. ........... 711/162 |
| 6,728,849 B2 * | 4/2004 | Kodama ..................... 711/162 |
| 7,096,269 B2 * | 8/2006 | Yamagami .................. 709/229 |
| 2001/0027480 A1 | 10/2001 | Kriegsman |

* cited by examiner

FIG. 3

| | 310 | 320a | 320b |
|---|---|---|---|
| Volume number | Path group number | Path group number |
| 0 | 0 | NULL |
| 1 | 1 | 0 |
| 2 | 0 | NULL |
| 3 | 1 | NULL |
| 4 | 1 | 0 |

| 410 | 420 | 440 | 430a | 430b | 430c |
|---|---|---|---|---|---|
| Path group number | Constraint | Status | Remote link number | Remote link number | Remote link number |
| 0 | Max 5MB/s | Unavailable | 0 | 1 | NULL |
| 1 | 9:00pm to 6:00am only | Available | 2 | 3 | 4 |
| 2 | Busy rate less than 70% | Available | 5 | 6 | NULL |
| 3 | Error rate less than 5% | Temporally Unavailable | 7 | 8 | NULL |
| 4 | Outboard control | Temporally Unavailable | 9 | 10 | 11 |

FIG. 4

Maximum throughput constraints — 700

Selected Path Group: T3 up to 5MB/s — 710
Target Server - Device: Juno - /dev/rdsk/c1t2d0
Maximum Throughput: [ 5 ] MB/s — 720

Alarm Options:
E-mail Address: [ admin@hitachi.com ] — 730
Phone Number: [ ] — 740

[ Apply ] — 750    [ Clear ] — 760    [ Close ] — 770

FIG. 7

| Network Name | Internet | ← 1100 |
|---|---|---|
| Warning | Overload (80% busy rate) | ← 1110 |
| Current Date and Time | 12-12-2000:13:46 | ← 1120 |

FIG. 11

| Path Group Number | Constraint | Status | Remote Link Number | Remote Link Number | Remote Link Number |
|---|---|---|---|---|---|
| 0 | Max 5MB/s | Available | 0 | 1 | NULL |
| 1 | 9:00am to 6:00pm only | Available | 2 | 3 | 4 |
| 2 | Busy rate less than 70% | Temporally Unavailable | 5 | 6 | NULL |

| | 2202 | 2204 | 2206 | 2208 |
|---|---|---|---|---|
| Volume Number | Path Group Number | Path Group Number | Priority |
| DB1a | 1 | 2 | 1 |
| DB2c | 1 | 2 | 2 |
| WEBe | 2 | NULL | 3 |

2102

| Priority | 1 | | 2232 |
|---|---|---|---|
| Primary | Storage System A | Volume C | 2234 |
| Secondary | Storage System B | Volume D | 2236 |
| Offset Address | 2048 | | 2238 |
| Size | 8KB | | 2240 |

REMOTE COPY WITH PATH SELECTION AND PRIORITIZATION

CROSS-REFERENCES TO RELATED APPLICATIONS

The present application is a continuation-in-part of and claims priority to Ser. No. 10/022,306 filed Dec. 14, 2001, now U.S. Pat. No. 6,728,849, and Ser. No. 09/823,470 filed Mar. 30, 2001, now U.S. Pat. No. 7,096,269, which are both incorporated by reference.

BACKGROUND OF THE INVENTION

The present invention relates generally to a distributed data storage system, and in particular to techniques for managing data flow over a plurality of connections between primary and remote storage devices.

The information technology revolution brings with it an ever increasing need for more storage capacity for business enterprises. It is expected that the average Fortune 1000 company's storage requirement will more than double in the coming years. In addition, growth has brought shortages of skilled persons in the information technology field. These challenges confront many companies facing the need to expand and improve their information technology assets. Increasingly, companies are turning to storage based remote copy as a method of coping with the need to prevent data loss from disaster. Remote copy creates and manages mirror images of storage volumes between a local, or primary storage system, and a remote or secondary storage system. The primary and secondary storage systems may be located at a far distance from one another. The two disk storage systems are connected by a network, through which updates on a local disk system are copied to the remote disk system. Nowadays, there are many types of networks that can connect the two storage systems performing remote copying. For example, one type of network can be a fast, reliable, secure and relatively more expensive network, such as, for example, a T3 private network. Another type of network is relatively more slow, insecure, and cheap, such as the Internet, for example.

Business critical applications, like on line transaction processing (OLTP) for banking, finance, flight reservation systems, and so forth, requires remote copy capabilities with low response times, high security, and high reliability. Other types of applications, like WEB mirroring, data warehousing, data center consolidation, bulk data transfer, and the like, do not have such requirements, because these applications generally do not need to copy data in real time.

While certain advantages to present remote copy technologies are perceived, opportunities for further improvement exist. For example, according to conventional remote copy technology, the network carrier companies charge customers based upon a required throughput, and sometimes offer pay per services for private networks. For example, a network carrier company may charge customers according to network bandwidth used per month. However, some remote copy users would like to reduce the costs associated with data connections and will be willing to accept operational limitations to do so. For example, users can lower expenses by using different networks for remote copy depending on application characteristics. A user could employ the Internet for web mirroring applications, but use a T3 network for OLTP for banking, for example. Users who would like to use the storage for backup purposes do not need a full-time data connection. However, conventional technology does not provide the capability to manage access to the data transmission services of a network carrier based upon the charges for the access. Further, issues such as security are important concerns to both the user and the network carrier. For the user, this means that valuable information assets can be protected by restricting access to the data being sent to remote storage. For the network carrier, this means that data integrity is preserved for each of its customers, and that no user receives access that is not authorized by the network carrier.

BRIEF SUMMARY OF THE INVENTION

The present invention provides techniques for managing data flow over a plurality of connections between primary and remote storage devices. In a representative example embodiment, when the primary storage system copies data to the secondary storage system, it chooses one of a plurality of networks connecting it to the secondary storage system, depending upon a users' policy. Since networks have different characteristics, in terms of, for example, performance, security, reliability, and costs, the user can specify which network(s) are used under various circumstances, i.e., daytime operation, nighttime operation, normal operation, emergency, and so forth. The storage systems comprise a mapping of volumes and ports. When performing copy operations, the primary storage system finds a volume storing the data, and available ports by accessing the mapping. The mappings are based upon policies that are input by a user.

In a representative specific embodiment, the primary storage system can be configured to limit data transfers using a particular network to within a set maximum throughput. For example, if a user configures a 5 MB/s of the maximum throughput for a network, the storage system uses the network only up to the threshold. When the 5 MB/s threshold is reached, the primary storage system chooses ports connecting to other networks. This mechanism provides substantially improved performance when networks susceptible to overload are used for storage operations. In other specific embodiments, if network access is purchased on a pay per use basis, the user can limit expenses for using the pay per use network according to a budget, by limiting the use of the pay per use network to a particular throughput, say 5 MB/s, in order to avoid incurring additional charges. In still further specific embodiments, the primary storage system may be configured to select ports connecting to inexpensive networks, except, for example, during daytime, when public networks experience high traffic volume. Further, the primary storage system that transfers remote copy data through a specific network may affect the performance of other network service, sometimes causing adverse conditions to corporate operations relying on these networks. Accordingly, the primary storage system can be configured to select from other, more expensive, i.e. private networks, for example, during the day to avoid these types of consequences.

In another representative specific embodiment, when a primary, i.e., inexpensive, network experiences a high traffic volume, an external network monitor that monitors traffic volume over the networks notifies the primary storage system. Then the primary storage system switches to other networks until the monitor informs the primary storage system that the primary network has returned to a low traffic volume. Another specific embodiment determines when the primary storage system has too much data pending transfer to the remote storage system. Generally, an inexpensive primary network is slower than an expensive secondary network. Accordingly, data to be transferred to the secondary storage system is accumulated in the primary storage system if traffic throughput of the primary network is insufficient to keep up with the data transfer demand of the primary storage system. If left unchecked, the secondary storage system will eventually be unable to maintain a mirror image copy of the primary storage system. To avoid this condition, the primary storage system monitors the quantity of data pending transfer that accumulates, and switches to a secondary, i.e., more expensive, network when the accumulated data exceeds a threshold.

In a further representative specific embodiment, a method for minimizing cost of network access by a storage apparatus is provided. The method comprises specifying a first network to be used for transferring data. Specifying a constraint for the first network is also part of the method. In various specific embodiments, the constraint comprises at least one of a throughput, a busy rate, an error rate, and a presence of an error, for example. However, other types of constraints are also used in various specific embodiments. The method also includes specifying a second network to be used for transferring data. Transferring data using the first network when conditions in the first network are in accordance with the constraint, otherwise transferring data using the second network is also included in the method. In a specific embodiment, the method further comprises transferring a portion of the data using the first network even when conditions in the first network are not in accordance with the constraint as a test, monitoring conditions in the first network during the test; and returning to transferring data using the first network when the test reveals that conditions in the first network are again in accordance with the constraint. In specific embodiments, the first network may be relatively less expensive to use than the second network, and/or the first network is a public network and the second network is a private network. When the user specifies the networks and constraints, the use can make the first network a higher priority network than the second network, or configure the apparatus such that detecting an abnormal condition in the first network and thereupon transferring data using the second network, for example.

Another strategy monitors an error count, such as a percentage error rate. The primary storage system monitors how many errors occur during data transfer through the network, and calculate an error rate. When the error rate becomes too great, which can be determined by exceeding a threshold, for example, the primary storage system switches to an expensive network. The threshold error rate can be determined from a customer's policy, for example. While using the expensive network, the primary storage system will also attempt to use the inexpensive network in order to continue to monitor the status of the inexpensive network. The primary storage system will discontinue using the expensive network if the error rate for the inexpensive network falls below the threshold. When TCP/IP protocol is used as the inexpensive network, a high occurrence of errors often indicates a high traffic volume in the network.

A still further strategy switches to expensive networks as an alternate data path to the inexpensive networks when an emergency occurs. According to this strategy, the primary storage system transfers data using the inexpensive network. But, if this fails, the primary storage system switches to the more expensive network.

In another representative embodiment, a method for selecting a network is provided. The method comprises monitoring one or more conditions in a plurality of networks. Comparing the one or more conditions in the plurality of networks to one or more user provided policies; and selecting one or more ports connecting to the plurality of networks are part of the method. In a specific embodiment, the monitoring one or more of conditions in the plurality of networks comprises using a network monitor to detect a condition within at least one of the plurality of networks, and thereupon set a value in a status indication, and the selecting of one or more of ports connecting to the plurality of networks comprises determining based upon a status indication whether to select a port from the one or more of ports connecting the plurality of networks. Each of the plurality of networks has one or more of user provided policies associated with it. In one specific embodiment, the method also comprises associating the plurality of networks with a plurality of path groups and then associating the one or more policies based upon the one or more path groups.

In a still further representative specific embodiment, a storage apparatus is provided. The storage apparatus comprises one or more disk drives; a memory that is operable to contain path selection information; a plurality of ports that provide switch-able connection to a plurality of networks; and a processor. Each of the plurality of networks has one or more user provided policies associated with it. Representative policies include, for example, a threshold, a maximum, a minimum, an average, a mean, a limit, a constraint, a priority, and a target. The processor, based upon monitoring of one or more conditions in the plurality of networks, selects at least one of the ports connecting the plurality of networks, based upon a comparison of the conditions in the plurality of networks to the plurality of user provided policies. Representative conditions include, for example, a throughput, a busy rate, an error rate, and a presence of an error. In specific embodiments, the storage apparatus further comprises a plurality of status indications, each of which is associated with one of the networks. The processor determines based upon the status indication whether to select a port from the one or more ports connecting to the plurality of networks. Representative statuses include, for example, available, temporarily unavailable, and unavailable. In a specific embodiment, a network monitor is also provided, which is operable to detect a condition within one or more networks, and thereupon to set a value in the status indication. Further, in some specific embodiments, the networks are grouped into a plurality of path groups, so that policies may be associated with the networks in a particular path group. Further, the disk drives may be divided into volumes, and the each of the volumes is permitted to access networks of one or more of the path groups.

In one embodiment is direct to a method for handling a remote copy request in a distributed storage system. The method includes providing a plurality of primary volumes within a primary storage system that is coupled to a primary host via a first network, the primary storage system being coupled to a secondary storage system via a second network. A first request is selected from a plurality of requests placed in a queue based on priority information associated with the requests. A first path group is selected from one or more path groups that could be used to transmit the request. The first request is transmitted to the secondary storage system using the first path group, the secondary storage system including a plurality of secondary volumes that are paired to the plurality of primary volumes.

In another embodiment, a method for handling a remote copy request includes receiving a plurality of requests at a primary storage system from one or more primary hosts, the primary storage system having a plurality of primary volumes; sorting the requests according to priority assigned to the requests; retrieving one of the requests that have been sorted; selecting a first path group to be used in transmitting the retrieved request, the first path being selected by accessing a path selection table that provides one or more path groups that may be used to transmit the retrieved request; wherein the retrieved request is transmitted to a secondary storage system after the selecting step, the secondary storage system including a plurality of secondary volumes that are paired to the plurality of primary volumes, wherein the path selection table assigns one or more path groups to each of the plurality of primary volumes.

In another embodiment, a computer storage medium (e.g., disk storage or internal random access memory) includes a computer program for handling a remote copy request in a distributed storage system. The computer program includes code for retrieving a given request from a plurality of requests to be sent to a secondary storage system from a primary storage system, the retrieved request having equal or higher priority than the remaining requests; code for selecting a first path group to be used in transmitting the retrieved request, the first path being selected by accessing a path selection table that provides one or more path groups that may be used to transmit the retrieved request; and code for transmitting the retrieved request using the selected first path to the secondary storage system, the secondary storage system including a plurality of secondary volumes that are paired to a plurality of primary volumes provided in the primary storage system.

In yet another embodiment, a storage system includes a storage controller to handle remote copy requests received from a host coupled to the storage system via a first network; a plurality of primary volumes that are paired to a plurality of secondary volumes provided in a remote storage system that is coupled to the storage system via a second network, a memory device including a path selection table, the path selection table assigning each of the plurality of primary volumes with one or more path groups that may be used to transmit a request that is associated with a given primary volume; and a computer program. The computer program includes code for assigning a first request received from the host with a first priority value that corresponds to priority assigned to a first primary volume to which the first request is associated; code for assigning a second request from the host with a second priority value that corresponds to priority assigned to a second primary volume to which the second request is associated, the first priority value being higher than the second priority value; and code for sorting the first and second requests according to their priority values, wherein the first request is placed ahead of the second request in a queue.

Numerous benefits are achieved by way of the present invention over conventional techniques. Specific embodiments according to the present invention provide techniques for managing data flow over a plurality of connections between primary and remote storage devices. If a customer purchases network access on a pay per use basis, these techniques keep expenses lower, since expensive networks are used during exceptional conditions. While the present invention has been described with reference to specific embodiments having a first and a second network, this is intended to be merely illustrative and not limiting of the wide variety of specific embodiments provided by the present invention.

These and other benefits are described throughout the present specification. A further understanding of the nature and advantages of the invention herein may be realized by reference to the remaining portions of the specification and the attached drawings.

BRIEF DESCRIPTION OF THE DRAWINGS

FIG. 3 illustrates a drawing of a representative path selection table in a specific embodiment of the present invention.

FIG. 4 illustrates a drawing of a representative path group table in a specific embodiment of the present invention.

FIG. 7 illustrates a diagram of a representative user interface in a specific embodiment of the present invention.

FIG. 11 illustrates a diagram of a representative network monitor message in another specific embodiment of the present invention.

DETAILED DESCRIPTION OF THE INVENTION

The present invention provides improved techniques for managing data flow over a plurality of connections between primary and remote storage devices.

Remote copy technology provides mirror image copies of one of a pair of disk systems to the other member of the pair. The two disk systems are interconnected by ports and located at some distance from one another. The remote copy system keeps a mirror image of disks located in the local, or primary system. The mirror image is stored in a remote, or secondary disk system. The local disk system copies data on a local disk of the pair. When a host updates data on the local system's disk, the local disk system transfers a copy of the data to the remote system through a series of ports and network links. Accordingly, no host operation is required to maintain a mirror image of a volume in the local system. For further description of representative remote copy systems in the art, reference may be had to a variety of references, such as U.S. Pat. Nos. 5,459,857 and 5,544,347.

Various types of methods exist for transferring data between the local and remote disk systems. In one type, called a "synchronous mode," the local disk system transfers data to the remote disk system before indicating that a write request for the data from a host is complete. In another type, called a "semi-sync mode," the local disk system indicates that the write request for data from a host is complete and then transfers the write data to the remote disk system. In both of these types of modes, succeeding write requests from the host are not processed until a previous data transfer is indicated to the host as finished. In an "adaptive copy mode" by contrast, data which is pending copy to the remote disk system is stored in a memory in the primary disk system, and transferred to the remote disk system when the local disk system and/or ports are available for the copy task. Accordingly, disk write operations by the host system to the primary system can continue without pause for completion of the copy operation to the remote storage system.

For further description of representative transfer modes in remote copy systems in the art, reference may be had to a variety of references, such as U.S. Pat. No. 5,933,653.

Figure 1A:
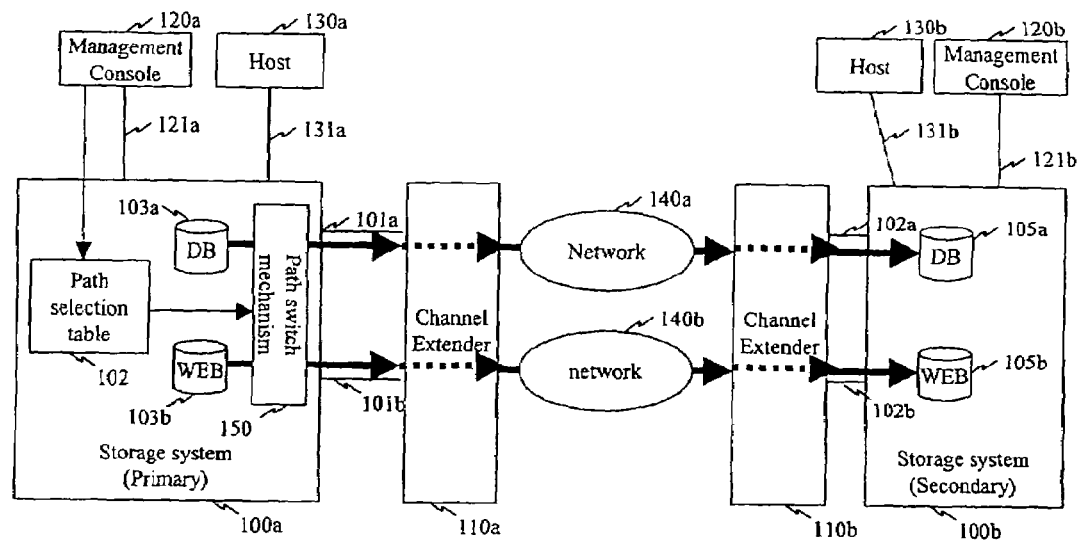
FIGS. 1A-1B illustrate drawings of representative system configurations in a specific embodiment of the present invention.
Figure 1B:
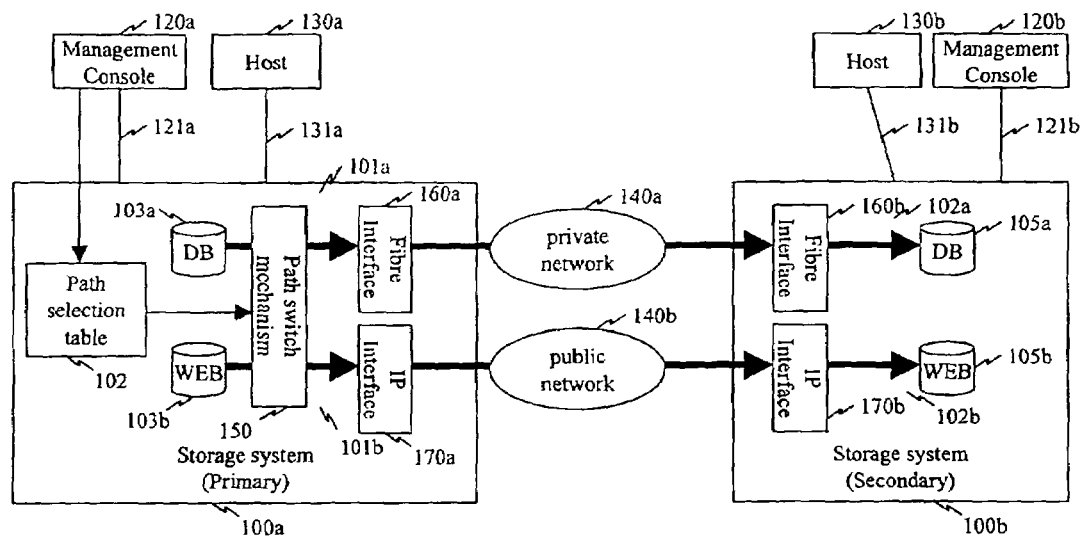

FIGS. 1A-1B illustrate drawings of representative system configurations in a specific embodiment of the present invention. FIG. 1A shows a distributed storage system including at least two storage systems, which are named a primary storage system 100a and a secondary storage system 100b, comprise one configuration for using a remote storage backup system. Each of the primary storage system 100a and the secondary storage system 100b comprise one or more volumes that store data. The storage systems 100a and 100b have processors which execute programs, and a memory for storing control data and tables for the programs. During operation, data stored on volumes of the primary storage system 100a is copied to identical volumes in the secondary storage system 100b. This operation is sometimes referred to as "mirroring" or "mirror imaging." For example, information stored on volumes 103a and 103b of the primary storage system 100a may be mirrored on the volumes 105a and 105b of the secondary storage system 100b. The primary storage system 100a and the secondary storage system 100b may be under the control of a single entity, or alternatively, a service provider may own a storage system which is used to provide backup services to the owner of the primary storage system 100a. Additionally, in some embodiments, the role of primary copy and secondary, or backup copy, may be reversed or even shared between the two storage systems. In these embodiments, the secondary storage system 100b may mirror some of the volumes of primary storage system 100a, and the primary storage system 100a may mirror some of the volumes of the secondary storage system 100b.

One or more host systems, such as host 130a and host 130b, connect to at least one of the primary storage system 100a and the secondary storage system 100b by a channel path 131a, and a channel path 131b, respectively. In example specific embodiments, channel paths 131a and 131b are implemented using SCSI, Fibre Channel, ESCON, and the like. The host systems 130a and 130b access data stored on the volumes 103a and 103b in the primary storage system 100a and the secondary storage system 100b, respectively, through channel paths 131a and 131b, respectively.

Management consoles 120a and 120b connect to the primary storage system 100a and the secondary storage system 100b, respectively, by paths 121a and 121b, respectively. In an example embodiment, the paths 121a and 121b may be LAN, proprietary path, SCSI, Fibre Channel, ESCON, and the like. An administrator inputs policies for creating path selection table 102 through management console 120a.

In a representative specific embodiment, the network 140a is a public, low performance, low security, network that is relatively low in cost to use. In an example embodiment, network 140a is the Internet. As used herein, the term "public" is used to refer to networks that are accessible by virtually anyone who is certified (or sometimes uncertified). The network 140b is a private, high performance, high security network that is relatively more expensive to use. In an example embodiment, the network 140b is a T3 communication line. As used herein, the term "private" is used to refer to networks that are dedicated to a particular user or group of users that certain users cannot access. The term "public" is used to refer to all other networks.

This present invention is described using simplified representative embodiments, in which just two types of networks provide connections between the primary storage system 100a and secondary storage system 100b, for clarity. However, these simplified examples are intended to be merely illustrative for the purposes of explanation, rather than limiting of the present invention. In many specific embodiments, three or more different types of networks are used in a manner similar to that described herein with reference to these specific embodiments.

In FIG. 1A, a plurality of channel extenders 110a and 110b provide protocol conversion between ports, such as ports 101a and 101b, and the networks 140a and 140b. For example, if a port 101a is a SCSI type interface, and network 140a is the Internet, then the channel extenders 100a and 100b convert data from the SCSI format to the TCP/IP protocol, and vise versa. One or more ports, such as ports 101a and 101b, connect the primary storage system 100a and the channel extender 110a. The channel extender 110a provides connection to the networks 140a and 140b. Port 101a provides connection to network 140a, while port 101b provides connection to network 140b through the channel extender 110a. One or more ports 102a and 102b also connect the secondary storage system 100b and the channel extender 110b. The channel extender 110b provides connection to the networks 140a and 140b.

FIG. 1B illustrates an alternative specific embodiment, in which the primary storage system 100a and/or secondary storage system 100b support various types of protocols. Accordingly, the respective channel extenders 110a and 100b are not required. In this specific embodiment, the ports 101a and 101b in the primary storage system 100a connect directly to the networks 140a and 140b using one or more interfaces, such as a fibre interface 160a and an EP interface 170a, for example. Analogously, ports 102a and 102b in the secondary storage system 100b connect directly to networks 140a and 140b via fibre interface 160b and IP interface 170b, respectively.

Figure 2:
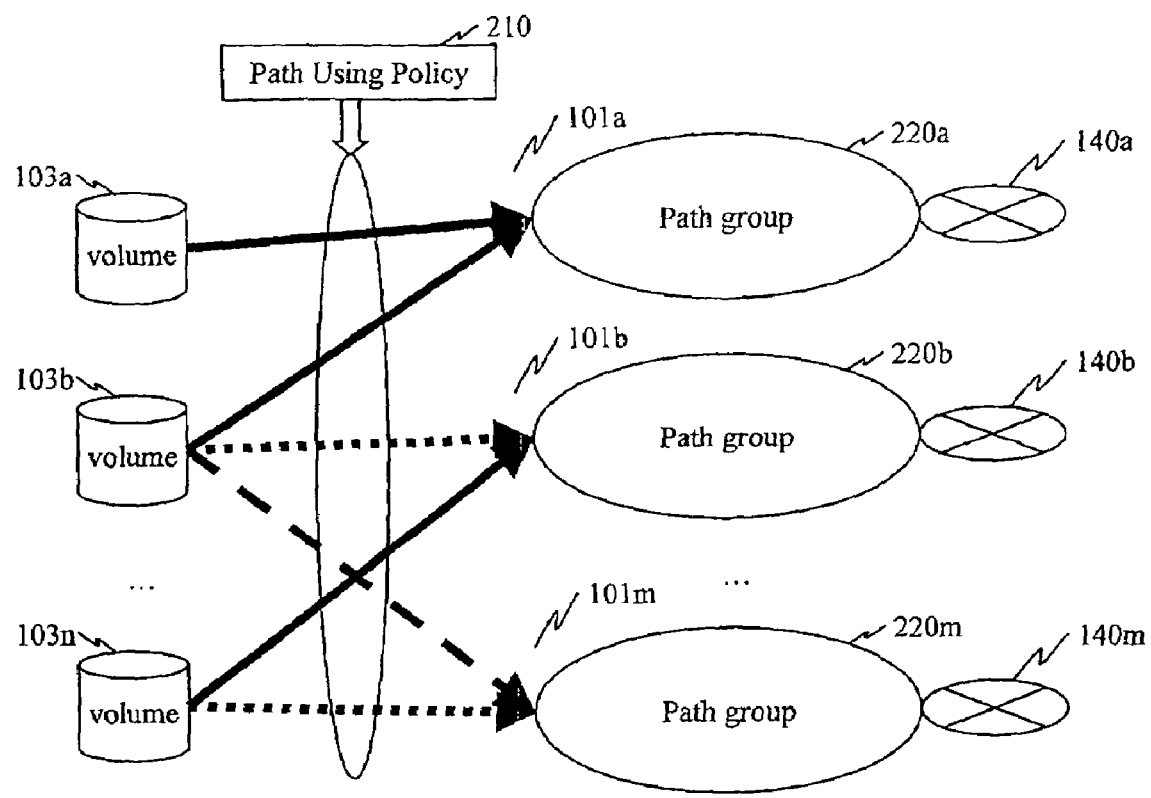
FIG. 2 illustrates a drawing of a representative relationships between paths and volumes in a specific embodiment of the present invention.

FIG. 2 illustrates a drawing of a representative relationships between paths and volumes in a specific embodiment of the present invention. As shown in FIG. 2, volumes 103a, 103b, . . . , 103n within the primary storage system 100a are capable of sending data via one or more path groups, such as path groups 220a, 220b, . . . , 220m. Each path group comprises one or more ports, such as ports 101a and 101b, that connect to a network, such as network 140a, for example. In FIG. 2, path group 220a comprises port 101a, connecting to network 140a, path group 220b comprises port 101b, connecting to network 140b, and so forth.

A path using policy 210 maps a volume and one or more path groups, and defines priority for using paths when transferring data to the secondary storage system 100b. For example in FIG. 2, when the primary storage system 100a transfer data on volume 103b to the secondary storage system 100b, it selects port 101b in path group 220a. However, if the path group 220a is not available for some reason, then it selects path group 220b. If the path group 220b is not available, then it selects path group 220m. For another example in FIG. 2, a volume 103a is allowed to use paths in only path group 220a. In a specific embodiment, the path using policy 210 is implemented using tables, as illustrated in FIG. 3 and FIG. 4, which are described herein.

FIG. 3 illustrates a drawing of a representative path selection table in a specific embodiment of the present invention. As shown in FIG. 3, a path selection table 300 maps a volume number 310, which corresponds to a volume, such as volumes 103a and 103b in FIG. 1, and one or more path group numbers 320a and 320b, which correspond to path groups, such as path groups 220a and 220b in FIG. 2, for example. The volume number 310 is unique to each volume within a storage system. For example, the primary storage system 100a, which comprises volumes 103a and 103b, will have unique volume numbers 310 corresponding to the volumes 103a and 103b in the path selection table 300.

The path group numbers 320a and 320b are unique to each path group defined for a storage system. When two or more entries for the path group number exist, such as 320a and 320b, for example, the number of the entries corresponds to the number of different networks connected to the storage system. The preceding path group numbers, 320a, have a higher priority than succeeding path group numbers, 320b. When transferring data to the secondary storage system 100b, the primary storage system 100a selects a path group having a higher priority. For example, in FIG. 3, the path group number 320a has higher priority than path group number 320b. In the second row of table 300, when transferring data on volume with number 1, primary storage system 100a selects a port in path group with number 1 rather than path group with number 0.

If there are fewer path groups than entries for path groups in path selection table 300, then a NULL string is stored in the remaining entries in the path selection table. For example in FIG. 3, the volume number 0 is allowed to use path group number 0, but no other path groups. So, a NULL is stored in the path group number 320b for the volume 0.

FIG. 4 illustrates a drawing of a representative path group table in a specific embodiment of the present invention. As shown in FIG. 4, a path group table 400 provides information about the path using policy 210, and maps path groups and ports. The path group table 400 comprises a path group number 410, which is a unique number assigned to each of the path groups for a particular storage system. A constraint 420 holds constraints that apply to the use of the paths within the path groups. For example, the constraint 420 stores "Max 5 MB/s" for path group 0. Accordingly, the paths in the path group 0 must not exceed 5 MB/s for transferring data. One or more constraints can be registered to a particular path group. A variety of types of constraints can be used in various specific embodiments according to the present invention. Representative examples of specific constraints are described herein below. A port number 430a, 430b, and 430c each hold a number corresponding to a port in the path group. Each port has a unique port number within a storage system 100.

If there are fewer ports in a path group than there are entries in the path group table 400, then a NULL string is stored into the vacant entries. For example, the path group number 0 has only two ports, port number 0 and port number 1. Therefore, a NULL is stored in the port number 430c.

A status 440 holds a current status of a path group. In a specific embodiment, the status takes values such as "available," "unavailable," or "temporarily unavailable." The status of "available," indicates that the primary storage system 100a can use the corresponding port in the path group. The status of "unavailable" indicates that the primary storage system 100a cannot use the corresponding port. The status of "temporarily unavailable" allows the primary storage system 100a to attempt to use a path group 220 for a certain interval, e.g., once per minute, in order to check availability. For example, if constraint 420 comprises "Error rate less than 5%" and status 440 shows "temporarily unavailable," then data is transferred via the path group 220a once per minute, for example. The primary storage system 100a monitors the results. When the error rate falls below 5%, for example, the primary storage system 100a changes the status 440 to "available."

Figure 5:
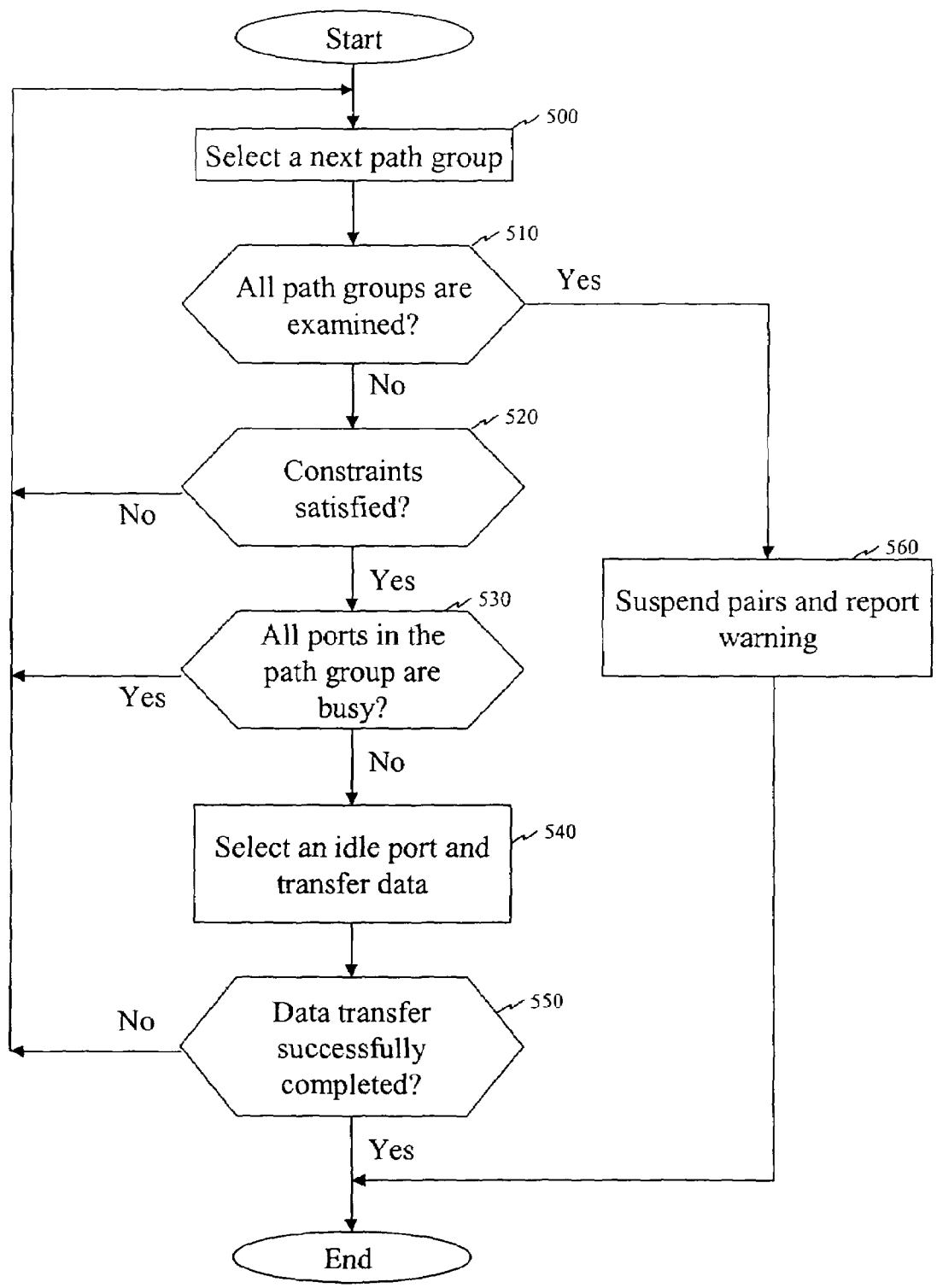
FIG. 5 illustrates a flowchart of a representative path selection process in a specific embodiment of the present invention.

FIG. 5 illustrates a flowchart of a representative path selection process in a specific embodiment of the present invention. As shown in FIG. 5, when a request to transfer data to the secondary storage system 100b arises, the primary storage system 100a executes a plurality of steps. In a step 500, the primary storage system 100a selects a path group to transfer data to the secondary storage system 100b, by accessing path selection table 300. Since primary storage system 100a knows the volume storing data to be transferred, it determines a row corresponding the volume in the path selection table 300. Then, it selects path group number 320a in the first iteration. If the selected path group does not satisfy constraints (step 520), then the primary storage system 100a selects path group number 320b in the second iteration (step 500).

In step 520, the selected path group is examined to determine whether the constraints are satisfied. If all path groups listed in the path selection table 300 do not satisfy the constraints, then processing proceeds to a step 560. In step 560, the primary storage system 100a suspends the mirroring operations between the pair of volumes in the primary storage system 100a and the secondary storage system 100b, and reports a warning to a user.

If there is a path group that satisfies the constraints in step 520, then, at a step 530, a check is performed to determine whether or not all ports in the path group are busy. A port is busy when the primary storage system 100a is transferring data using the port. If there's a port that is idle, then, in a step 540, the primary storage system 100a selects the idle port, and transfers data through the port. Next, in a step 550, a check is performed to determine if the data transfer has been completed successfully. If the data transfer has been completed successfully, then processing is finished. Otherwise, control proceeds back to step 500, in which the primary storage system 100a tries another path group.

Constraints

A variety of types of constraints may be used in specific embodiments of the present invention. The following are representative examples of constraints that may be used in various specific embodiments. This list is not intended to be exhaustive, but rather, illustrative of some of the many different types of constraints that are used in various specific embodiments of the present invention.

A time constraint limits the time when the primary storage system 100a is allowed to use a particular path group. For example, if a time constraint of "9:00 pm to 6:00 am only" is active for a particular path group, and the current time is 8:00 am, then the primary storage system 100a must not use paths in that particular path group. The primary storage system 100a comprises a time clock, which is used to determine if the time is within the bounds of a time constraint, if a time constraint exists for a particular path group. The primary storage system 100a checks the time clock on a regular basis (e.g. once per minute). When the time constraint is satisfied, the primary storage system 100a changes the status 440 to "available." Similarly, when the time constraint is no longer satisfied, then the primary storage system 100a changes the status 440 to "unavailable."

A throughput constraint limits the maximum throughput that the primary storage system 100a is allowed to use from a particular path group. For example, if a throughput constraint of "5 MB/s" has been set for a particular path group, and the current result of monitoring shows a throughput of 5.3 MB/s is being used, then the primary storage system 100b must not use paths in the particular path group. In various specific embodiments, processors, hardware, and/or software mechanisms within the primary storage system 100b monitor throughput of each port. In a specific embodiment, processors monitor the quantity of data transferred by a particular port during a specific time interval, such as every second. Then, a sum of the quantities monitored by each processor is computed. This sum indicated the throughput for the particular path group comprising the ports. When the throughput constraint is satisfied, the primary storage system 100a changes the status 440 to "available." Similarly, when the throughput constraint is no longer satisfied, then the primary storage system 100a changes the status 440 to "temporarily unavailable."

The primary storage system 100a continues to monitor throughput, and will set the status 440 to "available" when the throughput falls below the constraint. In a specific embodiment, while the status 440 continues to show that a particular path group is "temporarily unavailable," the primary storage system 100a selects the particular path group at regular intervals, to perform a trial data transfer. The primary storage system 100a selects the remaining path groups to perform non-trial data transfers.

A busy rate constraint limits the maximum "busy rate" that primary storage system 100a is allowed to use a particular path group. As used herein, the term "busy rate" refers to a percentage of total capacity of a network line which is being used to carry traffic. For example, if a busy rate constraint of "70%" has been set, and the current monitoring results indicate that a particular path group is 75% busy, then the primary storage system 100a must not select new paths in that particular path group. In various specific embodiments, processors, hardware, and/or software mechanisms within the primary storage system 100a monitor throughput of each port. In a specific embodiment, processors monitor the time that each port is used to transfer data during a specific interval, such as every second. Then, a sum of the time determined by monitoring each port is computed. This sum indicates the busy rate for the particular path group comprising the ports. When the busy rate constraint is satisfied, the primary storage system 100a sets the status 440 to "available." Similarly, when the busy rate constraint is no longer satisfied, then the primary storage system 100a changes the status 440 to "temporarily unavailable."

The primary storage system 100a continues to monitor busy rate, and will set the status 440 to "available" when the busy rate falls below the constraint. In a specific embodiment, while the status 440 continues to show that a particular path group is "temporarily unavailable," the primary storage system 100a selects the particular path group at regular intervals, to perform a trial data transfer. The primary storage system 100a selects the remaining path groups to perform non-trial data transfers.

An error rate constraint limits the maximum error rate that the primary storage system 100a is allowed to use a particular path group. For example, if the error rate constraint of "10%" has been set, and the current results of monitoring indicate that an error rate of 15% is present in a particular path group, then the primary storage system 100a must not select new paths in that particular path group. In various specific embodiments, processors, hardware, and/or software mechanisms within the primary storage system 100a monitor error rate of each port. For example, processors count the total number of transfers and the total number of errors for a port during a specific time interval, such as every minute. Then the sum of these results for each port is computed. The sum indicates the total number of transfers and errors. Dividing the total errors by the total transfers shows the error rate.

The primary storage system 100a continues to monitor the error rate, and will set the status 440 to "available" when the error rate falls below the constraint. In a specific embodiment, while the status 440 continues to show that a particular path group is "temporarily unavailable," the primary storage system 100b selects the particular path group at regular intervals, to perform a trial data transfer. The primary storage system 100a selects the remaining path groups to perform non-trial data transfers.

An outboard constraint limits the selection of paths by the primary storage system 100a based upon information about the availability of path groups provided by mechanisms outside of the primary storage system 100a. For example, a network monitor that monitors network 140a, is connected to the management console 120a, and sets the availability of the primary storage system 100a via management console 120a. The network monitor monitors, for example, a busy rate, a number of routers that are out of service, an error rate, a rate of packet loss, a collision rate of packets, and the like. If the network monitor finds abnormal conditions, then it informs the primary storage system 100a, which sets the status 440 to "unavailable" until the network 140a becomes available.

Another example of an outboard constraint is intervention by a user. For example, users may temporarily make network 140a unavailable to perform routine maintenance, and the like, for example. Before performing maintenance, the user sets the status 440 to "unavailable" for the network 140a in the primary storage system 100a using the management console 120a. After completing the maintenance, the user sets the status 440 to "available" once again.

Figure 6:
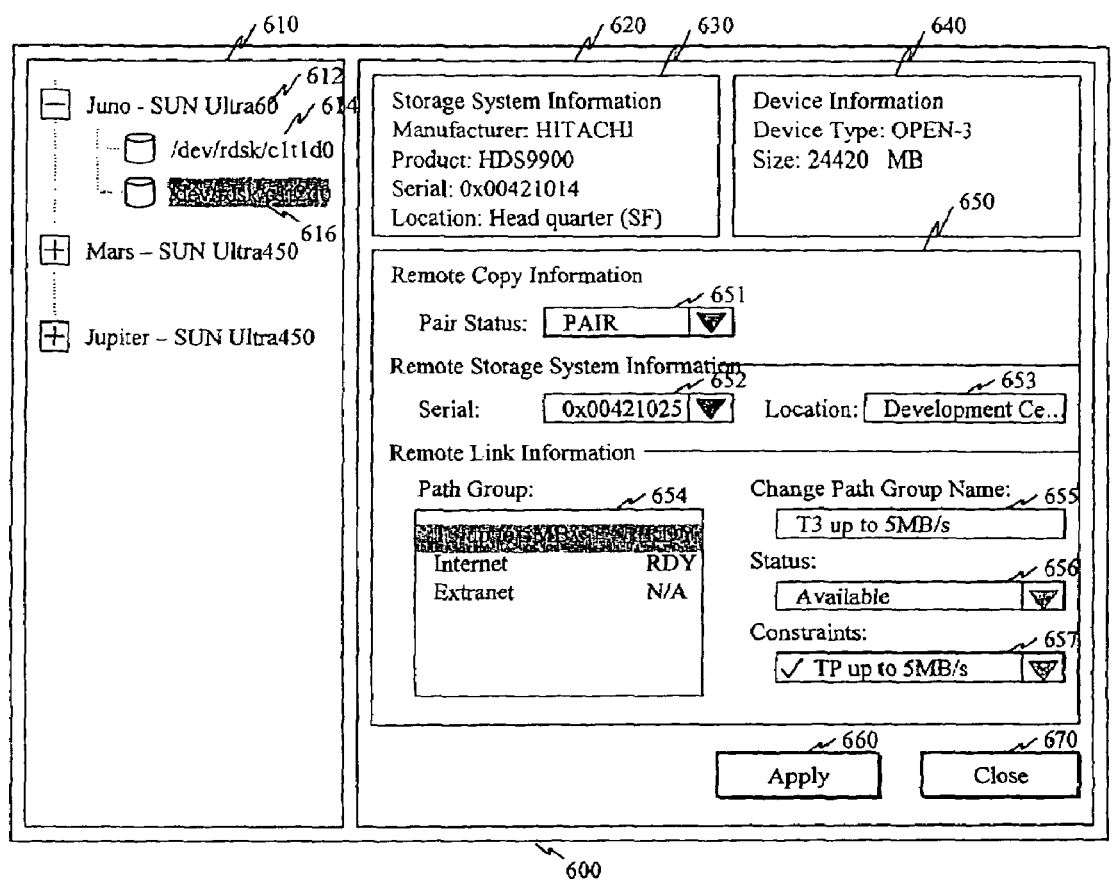
FIG. 6 illustrates a diagram of a representative user interface in a specific embodiment of the present invention.

FIGS. 6 and 7 illustrate diagrams of a representative user interface in a specific embodiment of the present invention. In order for users to apply constraints to networks traffic, users need to be able to provide constraint information to the primary storage system 100a. As shown in FIG. 6, a management window 600 provides a user interface to a user at the management console. When a user clicks a management icon, the management window 600 is displayed on the management console to the user. A server box 610 shows the relationship between servers and volumes. In the example of FIG. 6, the server named "Juno" has two volumes named "/dev/rdsk/c1t1d0" and "/dev/rdsk/c1t2d0." If a user selects one of these volumes, then the device information box 620 appears.

As shown in FIG. 6, the device information box 620 shows the information for the device "/dev/rdsk/c1t2d0." The device information box 620 provides storage system information 630, device information 640, and remote copy information 650. In the remote copy information 650, a pair status 651 shows whether the volume is mirrored or not, and its status if it is being mirrored. The PAIR status in FIG. 6 indicates that the primary and secondary volumes are mirrored.

The remote storage system information includes a serial 652, which indicates the product serial number of the paired storage system, and a location 653, which indicates the location of the paired storage system. When a user clicks the triangle button corresponding to the serial 652, information about the available storage systems connected to the local storage system described in the storage system information 630 is shown.

The port information includes a path group 654, which shows all path groups defined to the local storage system, and their status. If a path group does not connect to the selected remote storage system, then the status shows "N/A." If it is connected and available to use, then the status shows "RDY." The order from top to bottom implies priority for use of the path group. For example, in FIG. 6, the path group "T3 up to 5 MB/s" has the higher priority than "Internet," and the primary storage system 100b selects "T3 up to 5 MB/s" when transferring data to the secondary storage system 100b. A user can change this order using this user interface.

When a user selects one of path group from the path group 654, then information for the selected path group appears in a change path group name 655, a status field 656, and a constraints field 657. A user can input a new name into the change path group name 655 in order to change the name. The status field 656 shows detailed status for the selected path group. The status can be one of the statuses of "available," "unavailable," or "temporarily unavailable," which have been described herein above. Note that if a user selects "unavailable," then the primary storage system 100a does not use the path group for transferring the data on the volume.

Many kinds of constraints for the selected path group can appear in the constraints field 657 in various embodiments of the present invention. When a user clicks the triangle button corresponding the constraints field 657, the constraints for the selected path group are displayed. If a constraint is applied to the path group, a check mark is shown on the left of the constraint, as shown in FIG. 6. If a user selects one of the constraints shown, then an appropriate window appears (not shown in FIG. 6). For example, if the user selects the "TP up to 5 MB/s" constraint shown in FIG. 6, then a window 700 illustrated by FIG. 7 is presented to the user. Using the dialog in the window 700, the user can input necessary information to set a throughput constraint, for example. When the user clicks an apply button 750, then the constraint information set up by the user is read and applied. Clicking a clear button 760 clears the current constraint information, causing the check mark icon in the constraints field 657 to disappear. The user fills in the necessary information using the management window 600 in FIG. 6. When, the user clicks an apply button 660, the constraint information input by the user is read and applied. The information is applied by the primary storage system 100a, which either creates or changes the path selection table 300 and path group table 400, according to the constraint information entered by the user. Further, the management console 120a maps a path group name entered by the user in the path group field 654 into a set of port numbers, and translates the path group name to the port numbers. For example, the path group "T3 up to 5 MB/s" is translated to a port 0 and a port 1. Then, the management console 120a sends the port numbers along with a volume number and constraints to the primary storage system 100a.

Implementation Examples

The present invention will next be described with reference to examples of using some of the various functions and features of various specific embodiments thereof. This section is intended to be merely illustrative of some of the many ways that specific embodiments of the present invention can use constraints as described herein above. Note that these examples use only two networks of differing types, such as an expensive network and an inexpensive network, for clarity of explanation. However, as is apparent to those skilled in the art, many different configurations may be readily prepared using a variety of network types in accordance with various specific embodiments of the present invention.

Figure 8:
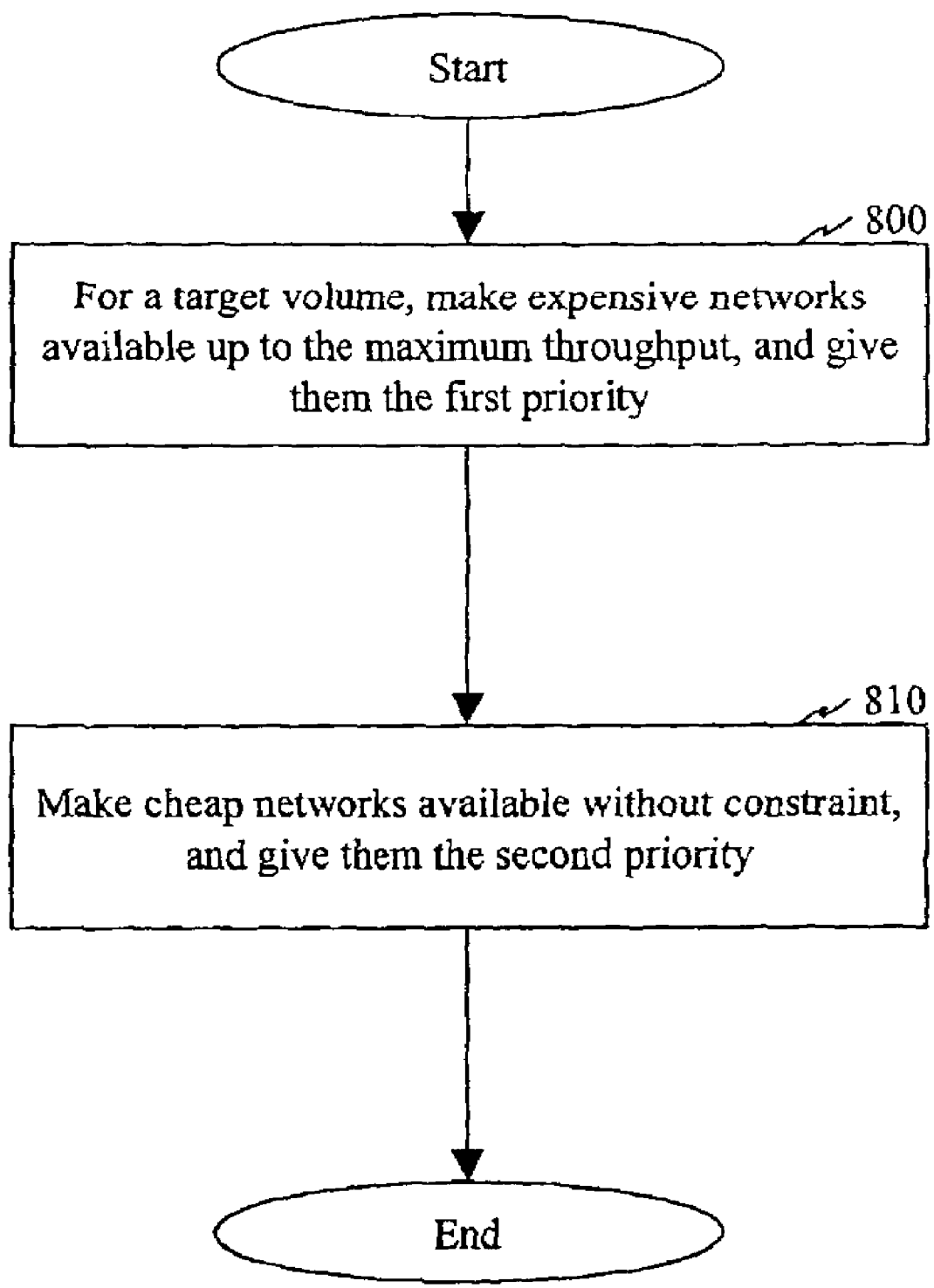
FIG. 8 illustrates a flowchart of representative processing in an implementation that uses an expensive network below a particular throughput or busy rate in a specific embodiment of the present invention.

FIG. 8 illustrates a flowchart of representative processing in an implementation that uses an expensive network below a particular throughput or busy rate in a specific embodiment of the present invention. In the example implementation shown in FIG. 8, an expensive network is used if throughput or busy rate is below a maximum throughput or busy rate. When a user sets the "throughput constraint" for an expensive network as described herein above, the use of the expensive network is kept below the maximum throughput. Further, if the user sets the "busy rate constraint" for the networks, then he can use the networks below the maximum busy rate. This example implementation is representative of a situation in which users are allowed to use expensive networks under a certain data throughput. When the maximum throughput is exceeded, the users may incur additional charges, or network performance may significantly degrade.

The flowchart in FIG. 8 shows the constraint strategy which a user configures using the management console 120a in order to cause the primary storage system 100a to use an expensive network below a maximum throughput or busy rate, but use an inexpensive network for traffic if the throughput or busy rate exceeds the maximum specified in the constraint. In a step 800, using the user interface described in FIG. 6 and FIG. 7, the user makes the expensive network available up to predetermined maximum throughput, and gives the expensive network the first priority. Then, in a step 810, again using the user interface described in FIGS. 6 and 7, the user makes the inexpensive network available without constraint, and gives the inexpensive network the second priority. After the user has configured the constraint strategy according to the above steps, the primary storage system 100a transfers data to the secondary storage system 100b, according to the flowchart in FIG. 5. As previously described herein above, and with reference to FIG. 5, the primary storage system 100a selects an expensive network for sending traffic until the preset maximum throughput is reached. Once the maximum throughput is reached, the primary storage system 100a selects the inexpensive network since the expensive network no longer satisfies the constraint. Similarly, the user can set a busy rate constraint in step 800, as well.

Figure 9:
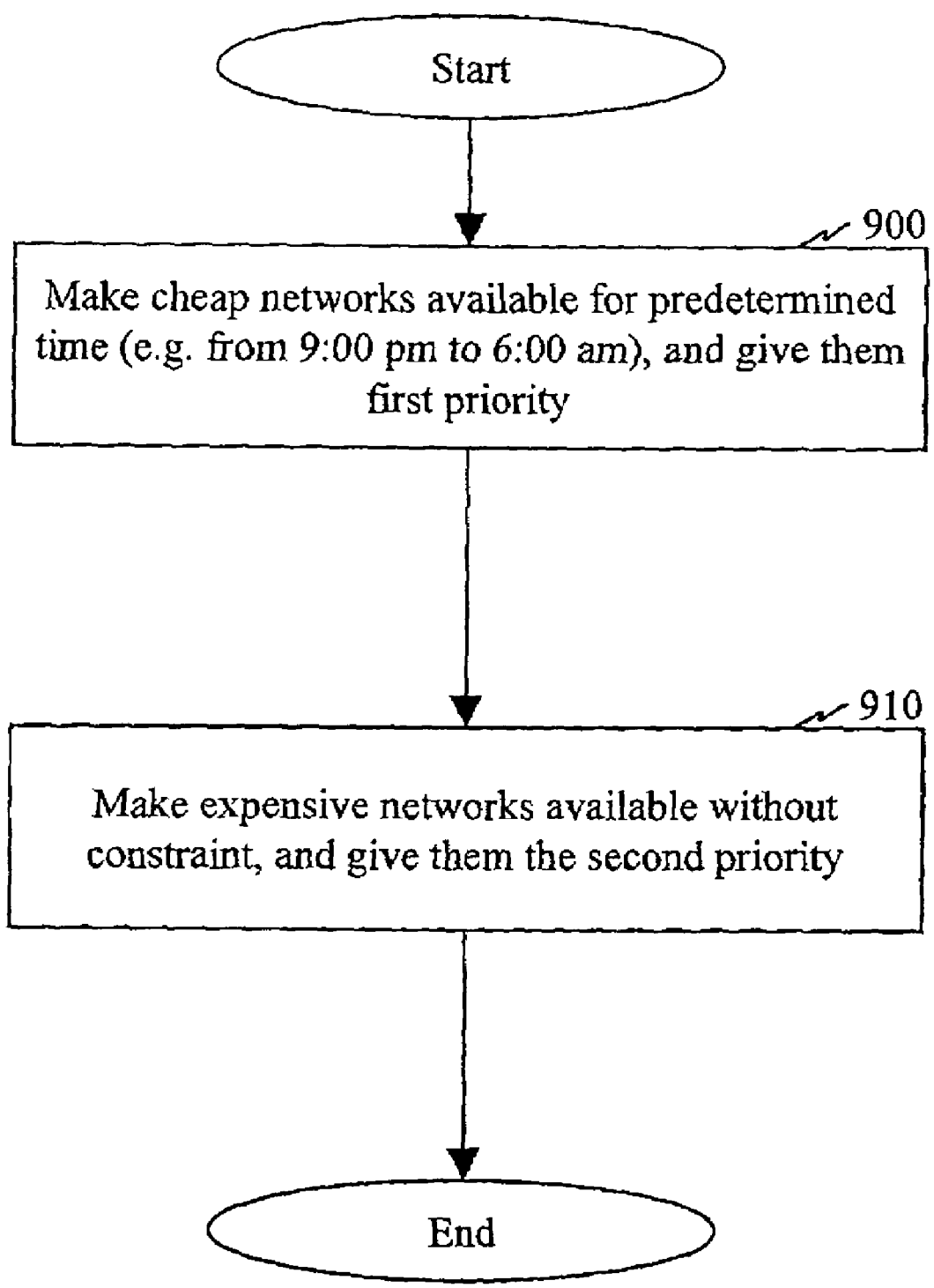
FIG. 9 illustrates a flowchart of representative processing in an implementation that uses an inexpensive network during night operations in a specific embodiment of the present invention.

FIG. 9 illustrates a flowchart of representative processing in an implementation that uses an inexpensive network during night operations in a specific embodiment of the present invention. In the example implementation shown in FIG. 9, an inexpensive, public network is used during nighttime operations. This example implementation is representative of a situation in which users are allowed to use public networks during nighttime, but avoid daytime public network access. Because public networks tend to have high traffic in the daytime, and transferring remote copy data through the public networks affects other services, like e-mails and web access, the user restricts use of the public network only to nighttime operations. In order to avoid using the public network during daytime operations, the user sets a "time constraint" for the public network. For example, the user may set a time constraint of "9:00 am to 9:00 pm" in order to prohibit the primary storage system 100*a* from using the public network.

The flowchart in FIG. 9 shows the constraint strategy which a user configures using the management console 120*a* in order to cause the primary storage system 100*a* to use inexpensive networks during nighttime. In a step 900, using the user interface described in FIG. 6 and FIG. 7, the user makes the inexpensive networks available only for nighttime (e.g. 9:00 pm to 6:00 am) use, and gives the inexpensive networks first priority. Then, in a step 910, again using the user interface described in FIGS. 6 and 7, the user makes the inexpensive networks available without constraint, and gives the inexpensive networks second priority. After the user has configured the constraint strategy according to the above steps, the primary storage system 100*a* transfers data to the secondary storage system 100*b*, according to the flowchart in FIG. 5. As previously described herein above, and with reference to FIG. 5, the primary storage system 100*a* selects an inexpensive network for sending traffic from the time period during 9:00 pm to 6:00 am. At other times, the primary storage system 100*a* selects the expensive network since the inexpensive network no longer satisfies the constraint. Similarly, the user can set a busy rate constraint in step 900, as well.

Figure 10:
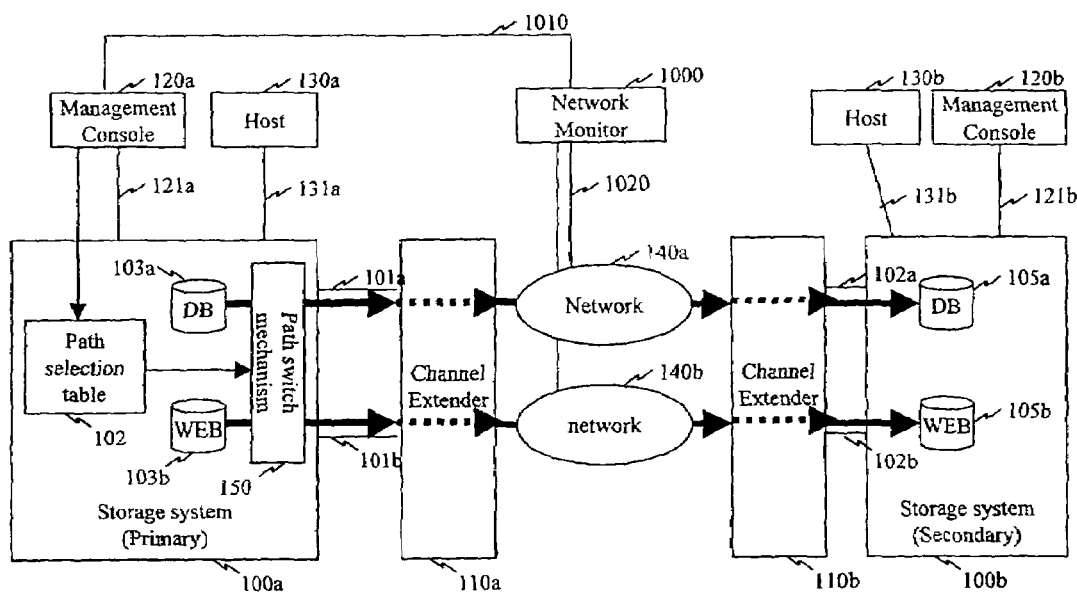
FIG. 10 illustrates a drawing of another representative system configuration in a specific embodiment of the present invention.

FIG. 10 illustrates a drawing of a representative system configuration in another specific embodiment of the present invention. In the example implementation shown in FIG. 10, the primary storage system 100*a* uses an inexpensive network except in case of an emergency. This example implementation is representative of a situation in which users subscribe to expensive networks on a pay per use basis. There are many different types of emergency cases that may be detected and responded to in various specific embodiments of the present invention. A brief sample of representative emergency cases will be described here. For example:

(1) When the inexpensive networks have high traffic and the primary storage system has a great deal of pending data. When an external network monitor that monitors traffic over the networks observes high traffic in the inexpensive network, the network monitor notifies the primary storage system 100*b*. Then the primary storage system 100*a* diverts traffic to other networks until the external network monitor indicates that the traffic in the inexpensive network has diminished.

(2) When the primary storage system has too much pending data. Generally, an inexpensive network is slower than an expensive network. So, data to be transferred to the secondary storage system accumulates in the primary storage system until there is sufficient network bandwidth available to move the accumulated data to the secondary storage system. If the inexpensive network continues to be slow, the primary storage system can, upon detecting this condition, switch to using a more expensive, and faster, network to send the accumulated data to the secondary storage system. In order to avoid a situation where the accumulated data makes it no longer possible to maintain a mirror image copy of the primary storage system data at the secondary storage system, the primary storage system monitors how much pending data has accumulated, and uses the more expensive, and faster, networks when the accumulated data exceeds a threshold.

(3) When errors exceed a threshold. The primary storage system monitors how many errors have occurred in transferring data through the networks and calculates an error count, which may be a percentage, for example. The primary storage system switches to a more expensive network when the error count for the inexpensive network exceeds a threshold. The threshold may be provided by a customer. While using expensive networks, the primary storage system 100*a* sends some data over the inexpensive network at regular intervals, to perform a trial data transfer. The primary storage system 100*a* selects the remaining path groups to perform non-trial data transfers. The primary storage system 100*a* ceases using the expensive networks if the error count for the inexpensive networks falls below the threshold. This technique is useful in specific embodiments in which a TCP/IP protocol network is used as the inexpensive network transferring protocol, because a high degree of errors in such TCP/IP networks often indicates a high volume of traffic in the network.

(4) When errors occur. The primary storage system monitors for the presence of errors that occur in transferring data through the networks. The primary storage system uses an expensive network as an alternate path for an inexpensive network, and switches to the expensive network when an error is detected in the inexpensive network. This technique is useful in specific embodiments in which the primary storage system first attempts to transfer data via the inexpensive network. If this fails, the primary storage system uses the expensive network.

As shown in FIG. 10, two storage systems, the primary storage system 100*a* and the secondary storage system 100*b*, comprise one configuration for using a remote storage backup system. A network monitor 1000, connects to network 140*a* and network 140*b*, and management console 120*a*. The network monitor 1000 monitors activity in networks 140*a* and 140*b*. A path 1020 connects the network monitor 1000 to networks 140*a* and network 140*b*. A path 1010 connects the network monitor 1000 to the management console 120*a*. A path 1020 and a path 1010 may be parts of the same network, such as the Internet, for example. If the network monitor 1000 detects a high traffic volume in network 140*a*, then the network monitor 1000 sends a message to the management console 120*a*.

FIG. 11 illustrates a diagram of a representative network monitor message in another specific embodiment of the present invention. In the representative message format illustrated by FIG. 11, a network name 1100 corresponds to the network name registered in the path group 654 in FIG. 6. For example, a network name of "T3 up to 5 MB/s" or "Internet" can be used. One purpose for the network name 1100 is to make the network identifiable by the management console 120*a*. A warning 1110 shows a type of warning that the network monitor 1000 discovered while monitoring the network. A variety of different types of warnings can be used in various specific embodiments of the present invention. For example, in a specific embodiment, warnings for "Overload" and "Change to Normal" are provided. An "Overload" warning indicates that the network monitor 1000 found an overload condition within the network being monitored. An "Overload" warning includes a current busy rate that the network monitor 1000 determined during monitoring the network. A "Change to Normal" warning indicates that the network monitor 1000 found a network 140*a* has returned to a traffic volume level lower than a threshold busy rate. A current date and time field 1120 indicates a time when the network monitor 1000 issued the message to the management console 120*a*.

Figure 12:
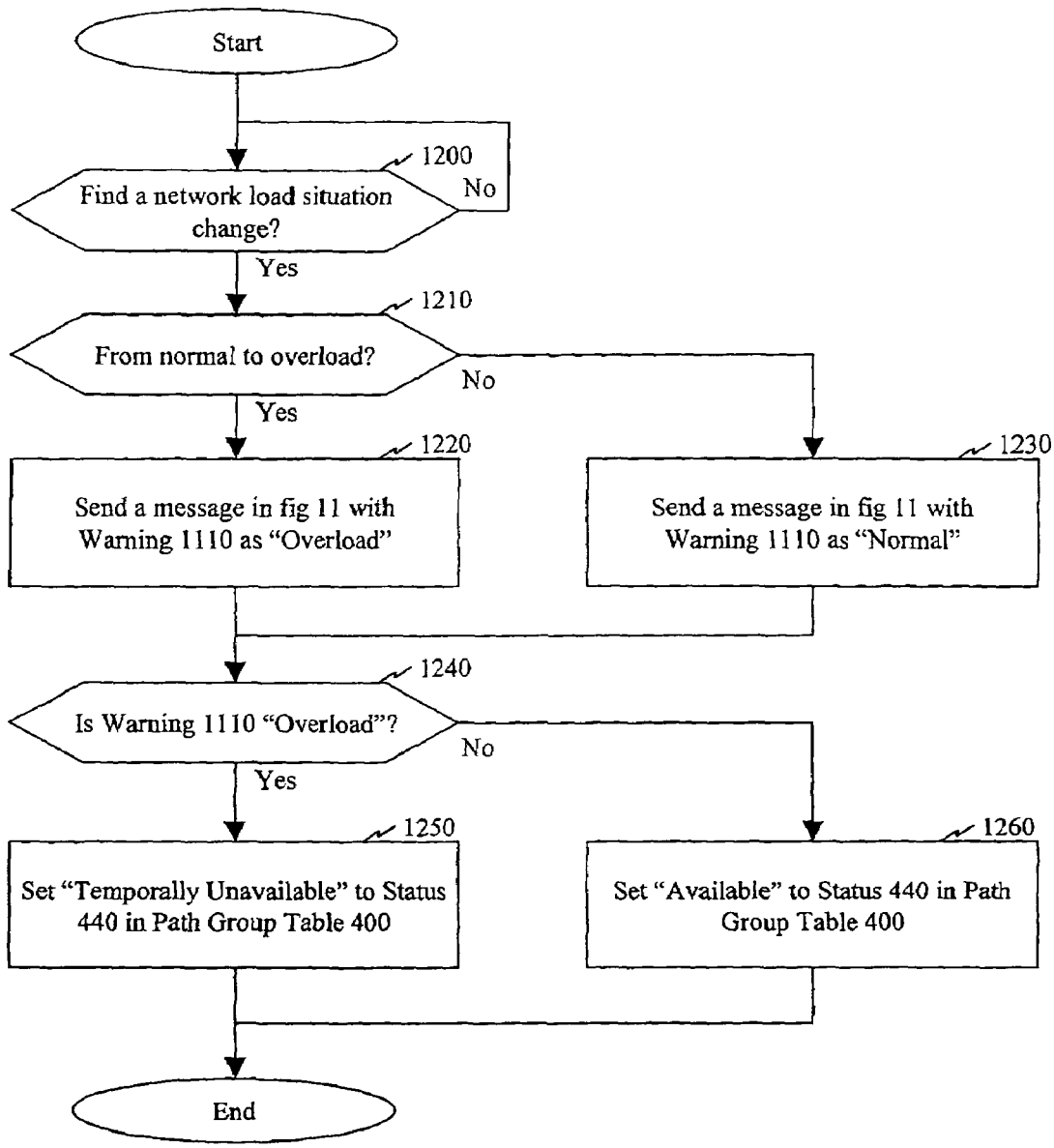
FIG. 12 illustrates a flowchart of representative processing in an implementation that uses a network monitor in a specific embodiment of the present invention.

FIG. 12 illustrates a flowchart of representative processing in an implementation that uses network monitor in a specific embodiment of the present invention. In the example implementation shown in FIG. 12, the network monitor 1000 performs steps 1200 to 1230, and the management console 120a performs steps 1240 to 1260. In a step 1200, the network monitor 1000 monitors networks for a change in situation, such as a load change, an emergency, and the like. If a load situation change is detected by step 1200, then, in a decisional step 1210, a determination is made whether the change is from normal to overload. If the situation change is from normal to overload then, in a step 1220, the network monitor 1000 stores "Overload" into the warning field 1110 of a message having a format such as the message format described herein above with reference to FIG. 11, and sends the message to the management console 120a. Otherwise, if in step 1210 it is determined that the situation changed from overload to normal, then in a step 1230, the network monitor 1000 stores "Normal" into the warning field 1110 of the message, and sends the message to the management console 120a.

In a decisional step 1240, responsive to receiving the message sent by the network monitor 1000, the management console 120a checks the warning field 1110, to see if the warning field 1110 stores an "Overload" or a "Normal" condition type. If the warning field 1110 stores an "Overload," then, in a step 1250, the management console 120a sets the status 440 for the network to "temporarily unavailable" in the path group table 400. Otherwise, if in step 1240, it is determined that the warning 1110 stores an "Normal," then in a step 1260, the management console 120a sets the status 440 for the network to "available." As described herein above with reference to the flowchart in FIG. 5, the primary storage system 100a will avoid using a network having a status 440 of "temporarily unavailable" or "unavailable." Accordingly, the networks that the network monitor 1000 determines are overloaded will not be selected by the primary storage system 100a.

Figure 13:
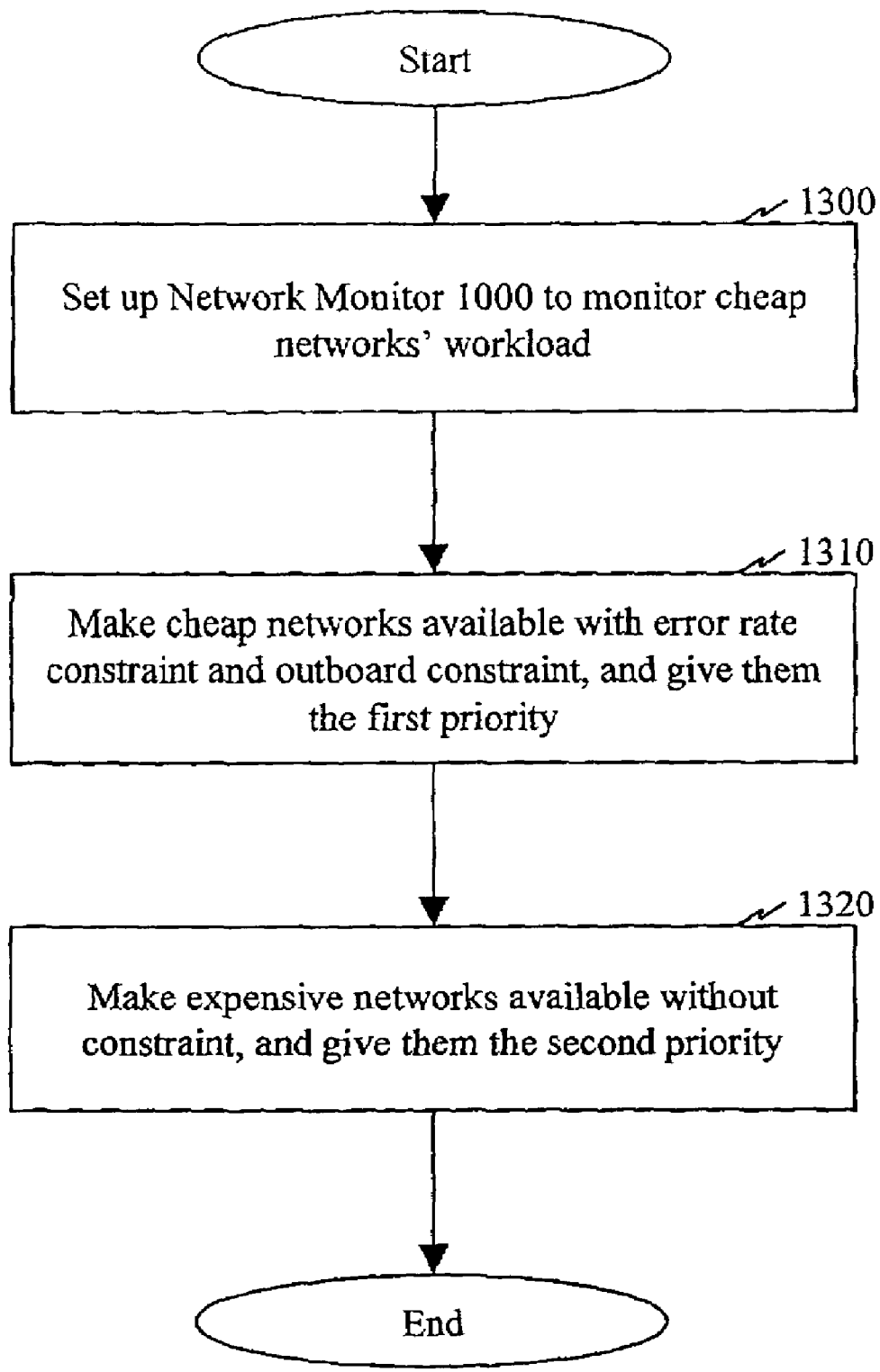
FIG. 13 illustrates a flowchart of representative processing in an implementation that uses an expensive network in emergency situations in a specific embodiment of the present invention.

FIG. 13 illustrates a flowchart of a representative processing in an implementation that uses an expensive network in emergency situations in a specific embodiment of the present invention. In the example implementation shown in FIG. 13, an inexpensive network is used if the workload situation is normal. When a user sets the error rate and outboard constraints for the inexpensive network as described herein, the use of the expensive network is reserved only for emergencies. This example implementation is representative of a situation in which users are allowed to use expensive networks only to deal with emergency situations. When the error rate constraint is exceeded, the network performance may be significantly degraded, causing the secondary storage system to be incapable of preserving a mirror image of the primary storage system. In a step 1300, the network monitor 1000 is configured to monitor inexpensive network 140a. A predetermined threshold for workload for the network 140a is configured using the user interface described above with reference to FIGS. 6 and 7. Once configured, the network monitor 1000 performs the processing described above with reference to FIG. 12.

In a step 1310, using the user interface described in FIG. 6 and FIG. 7, the user makes the inexpensive network 140a available with an error rate constraint, such as a predetermined threshold for the error rate, for example, and an outboard constraint, and gives the inexpensive networks first priority. The outboard constraint causes inputs from the network monitor 1000 to be reflected to the path group table 400 in the primary storage system 100a, as described herein above with reference to FIG. 12. In a step 1320, the user makes the expensive network 140b available without a constraint, and gives the expensive network second priority. Using this constraint strategy, the primary storage system 100a selects the inexpensive network 140a, so long as the network monitor 1000 determines that there are no overloads or emergency conditions in the inexpensive network 140a. If an overload is detected by the network monitor 1000, this information is forwarded to the management console 120a, which reflects this condition in the status field 440 for the inexpensive network 140a in the path group table 400. A change to the status field 440, causes the primary storage system 100a to alter its selection of networks, by choosing the expensive network 120b until the overload situation in the inexpensive network 140a is relieved.

Figures 14, 16:
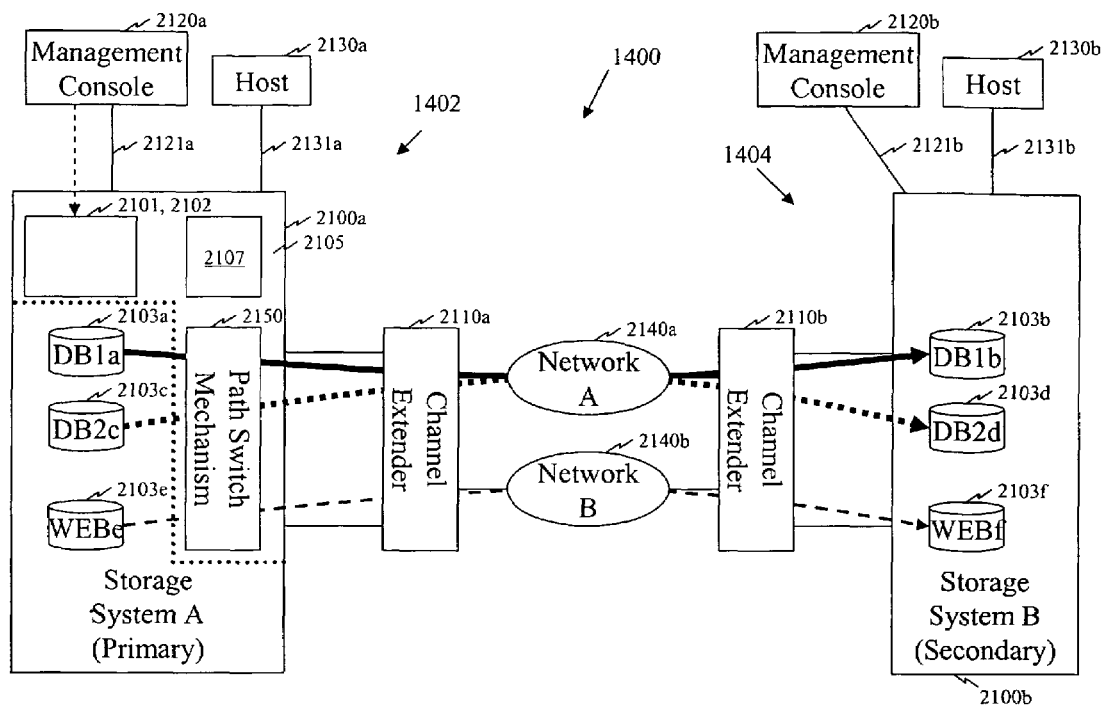
FIG. 14 illustrates a distributed storage system including primary and secondary data centers according to one embodiment of the present invention.
FIG. 16 illustrates a path group table provided in a primary storage system for use in selecting a port for transmitting a remote copy request to a secondary storage system according to one embodiment of the present invention.

FIG. 14 illustrates a distributed storage system 1400 including a primary data center 1402 and a secondary data center 1404 that are provided at different sites according to one embodiment of the present invention. The distributed storage system is configured to prioritize data requests according to predefined rules. The primary data center 1402 includes a primary storage system 2100a, a primary host 2130a, and a primary management console 2120a.

The primary storage system 2100a includes a storage controller 2105 and a plurality of primary volumes 2103a, 2103c, and 2103e. The volumes 2103a and 2103c are configured to store data for certain business or enterprise applications. The volume 2103e is configured to store data relating to the Internet applications.

The storage controller handles data requests received from the host. The data request includes remote copy requests ("RC requests"). The storage controller includes a path group table 2101 that provides path using policy, a path selection table 2102 that includes priority information for certain data requests, a processor 2107, and a path switch mechanism 2150 that directs the data to certain data paths. In the figure, only one block is used to represent a memory device wherein the tables 2101 and 2102 are stored. However, the tables may be stored in different memory devices within the storage controller. In one embodiment, one or both tables may be stored in one of the volumes in the storage systems.

The primary host communicates with the storage system 2100a including sending data request via a network 2131a. The management console 2120a communicates with the storage system 2100a via a network 2121a. In one embodiment, the management console is used to input values to define the path group table 2101 and the path selection table 2102.

The secondary data center 1404 includes a secondary storage system 2100b, a secondary host 2130b, and a secondary management console 2120b. The secondary storage system 2100b includes a plurality of secondary volumes 2103b, 2103d, and 2103f. The volumes 2103b, 2103d, and 2103f are paired to the primary volumes 2103a, 2103c, and 2103e, respectively, so that remote copies of the primary volumes are maintained at the secondary data center.

The secondary host communicates with the storage system 2100b including sending data request via a network 2131b. The management console 2120b communicates with the storage system 2100b via a network 2121b.

A first network 2140a and a second network 2140b couple the primary and secondary storage systems. A first channel extender 2110a connects the primary storage system to the first and second networks. A second channel extender 2110b connects the secondary storage system to the first and second networks. In another embodiment, the distributed storage system 1400 does not include the channel extenders. In such a system, the storage systems are configured to support various types of communication protocols. In yet another embodiment, only one network (e.g., only the first network) is used to connect the two storage systems.

Figures 15, 17, 18:
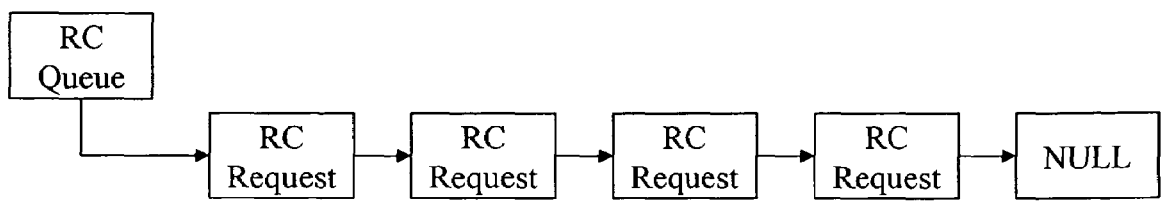
FIG. 15 illustrates a path selection table provided in a primary storage system for use in selecting a path for transmitting a remote copy request to a secondary storage system according to one embodiment of the present invention.
FIG. 17 illustrates the format of a remote copy request according to one embodiment of the present invention.
FIG. 18 illustrates a remote copy queue including a plurality of requests waiting to be transmitted to a secondary storage system according to one embodiment of the present invention.

FIG. 15 illustrates the path selection table 2102 according to one embodiment of the present invention. The table includes a volume number field 2202, a first path group number field 2204, a second path group number field 2206, and a priority field 2208. The volume number field lists the volumes in the primary storage system. Each volume is assigned a unique identification number for a given storage system. The first path group number field 2204 lists the path group that is to be first used for a given volume identified in the field 2202. The second path group number field 2206 lists the path group that is to be used next if the first path group is unavailable for the given volume identified in the field 2202. For example, if a RC request associated with the volume DB1a is to be sent to the secondary storage system 2100b, the path group 1 is used unless it is unavailable. If so, the path group 2 is used. The table 2102 may include additional path group number fields.

The priority field 2208 lists priority information of RC requests associated with the volumes listed in the field 2202. In the present embodiment, the priority is assigned to the volumes in the storage system 2100a in order to facilitate data consistency at the secondary storage system.

Accordingly, all RC requests of a given volume is given the same priority. For example, if the volume DB1, volume DB2c, and volume WEBe are assigned priority 1, priority 2, and priority 3, respectively, then all RC requests associated with the volume DB1a are assigned priority 1 and given priority over the RC requests associated with the volumes DB2c and WEBe. Similarly, the RC request associated with the volume DB2c is assigned priority 2 and given over the RC requests associated with the volume WEBe.

FIG. 16 illustrates the path group table 2101 according to one embodiment of the present invention. The table includes a path group number field 2212, a constraints field 2214, a status field 2210, a first remote link number field 2218, a second remote link number field 2220, and a third remote link number field 2222.

The path group number field 2212 lists a unique number assigned to each of the path groups. The field 2214 indicates constraints that are associated with the path groups listed in the field 2212. The field 2216 indicates whether or not a given path group is available fir data transmission. The fields 2218, 2220, and 2222 indicates the ports that are assigned to each path group.

FIG. 17 illustrates the format of a RC request according to one embodiment of the present invention. Each RC request includes a priority 2232 assigned to the request, an identification 2234 of a primary volume to which data has been copied (or is to be copied), an identification 2236 of a secondary volume to which the data is to be copied, a location 2238 of data in the primary volume, and a size 2240 of the data.

In the present embodiment, each storage system is assigned a unique number in a given distributed system, and each volume is assigned a unique number in a given storage system. Accordingly, a given primary volume can be specified if the storage system and volume numbers are identified. Similarly, a secondary volume can be specified if the storage system and volume numbers are identified.

As explained above, a RC request is assigned with the priority of its primary volume. The steps involved in assigning the priority to the RC request are as follows: (1) the storage system (or controller therein) examines the identification field 2234 of the request that has been received from a host in order to determine its primary volume; (2) the path selection table 2102 is accessed to determine the priority assigned to that volume; and (3) priority information is inserted into the field 2232 of the request.

FIG. 18 illustrates a RC queue formed within the primary storage system according to one embodiment of the present invention. The queue has a plurality of RC requests waiting to be transmitted to the secondary storage system. The requests have been arranged according to the priority information assigned to the requests. A request is nulled once it has been executed successfully, i.e., the write data associated with the request has been copied to the secondary volume successfully.

Figure 19:
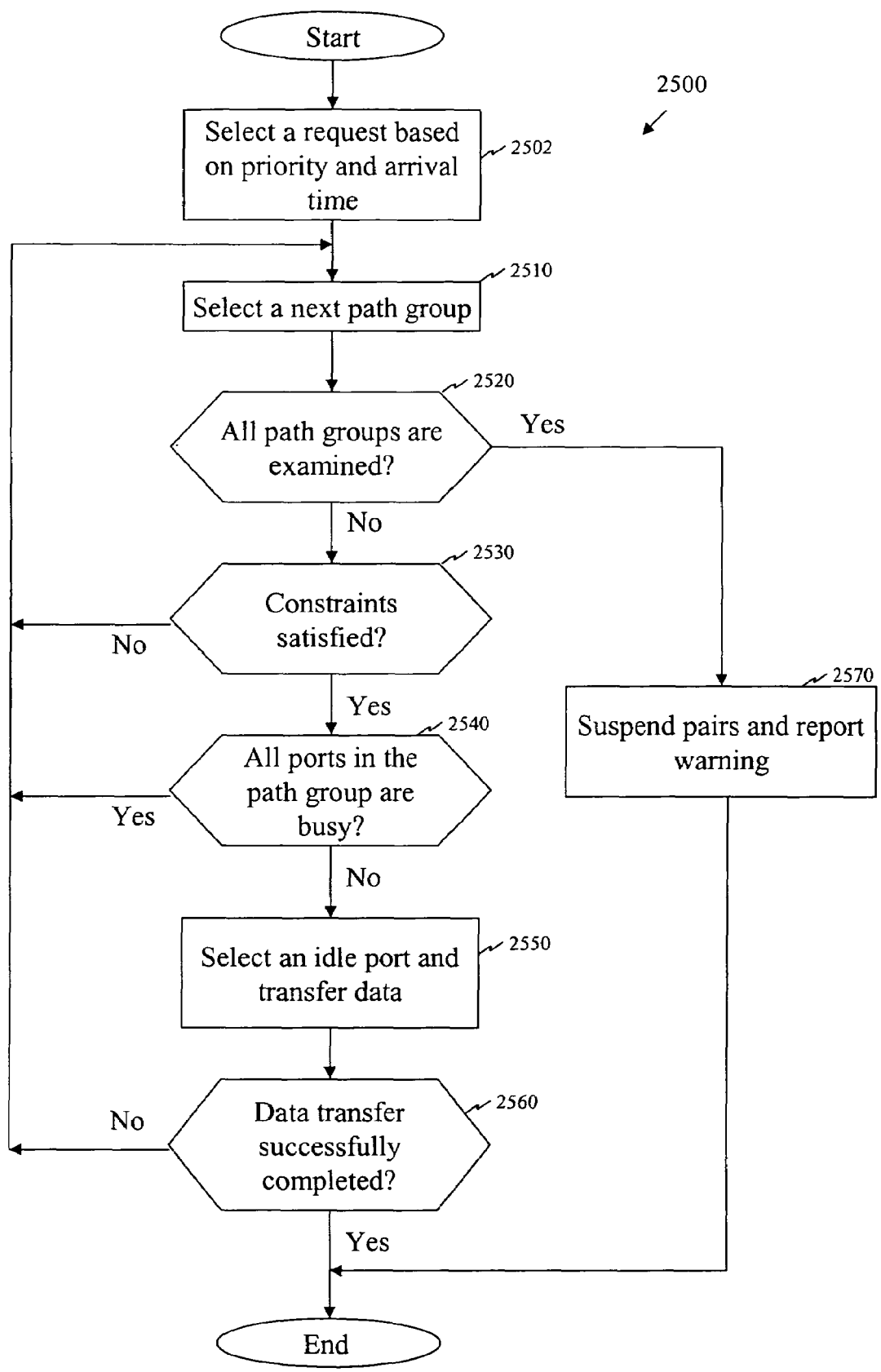
FIG. 19 illustrates a process for transmitting a request from a primary storage system to a secondary storage system using a path selection table and a path group table according to one embodiment of the present invention.

FIG. 19 illustrates a process 2500 for transmitting a RC request to the secondary storage system using the path selection table according to one embodiment of the present invention. The primary storage system executes the process 2500 if it determines that the RC queue includes one or more requests that need to be transmitted to the secondary storage system.

At step 2502, the storage system retrieves the request with the highest priority. If there are more than one request, then the storage system selects the one that had arrived at the RC queue the earliest, e.g., the one with the earliest timestamp. In one embodiment, the RC queue presorts the requests that it has received, so that the request at the front of the queue is selected at step 2502.

A path group is selected (step 2510). Initially, the path selection table 2102 is used to select the first path group associated with the primary volume of the selected request. The primary volume of the request is identified by accessing the field 2234 of the request. For example, if the field 2234 of the request indicates the volume DB1a, the path group 1 is selected at step 2510 initially.

The process determines whether or not all path groups have been examined (step 2520). At first, the selected path group 1 has not yet been examined, so the process proceeds to a step 2530. However, if the path group 1 has already been examined and there is no other path group, then the pairing is suspended since there is no available path group at that moment (step 2570).

At step 2530, the selected path group is examined to determine whether or not the specified constraints are satisfied. If so, the process proceeds to a step 2540. Otherwise, the process returns to step 2510 to select the next path group, e.g., the second path group listed in the field 2206. Exemplary constraints are illustrated in the table 2102 of FIG. 16.

At step 2540, the storage system checks to determine whether or not there is any idle port from those assigned to the selected path group. The table 2102 defines the ports that are assigned to a given path group. For example, ports 0 and 1 are assigned to the path group 1, so these ports are checked to see if either is idle. If an idle port exits, the process proceeds to a step 2550. Otherwise, the process returns to step 2510.

At step 2550, an idle port identified at the previous step is selected. The write data associated with the selected request is transmitted to the secondary storage system using the selected port. If an acknowledgement is received from the secondary storage system, then the remote copy process for this particular request ends. That is, this request is nulled from the RC queue and the next request is selected. If the acknowledgement is not received, than the process returns to step 2510.

The preceding has been a description of the preferred embodiment of the invention. It will be appreciated that deviations and modifications can be made without departing from the scope of the invention, which is defined by the appended claims.

What is claimed is:

1. A method for handling a remote copy request in a distributed storage system, the method comprising:

providing a plurality of primary volumes within a primary storage system that is coupled to a primary host via a first network, the primary storage system being coupled to a secondary storage system via a second network, wherein each primary volume is assigned a priority;

selecting a first request from a plurality of requests placed in a queue based on priority information associated with the requests, wherein each request is directed to a given primary volume and is assigned the same priority as the given primary volume;

selecting a first path group from one or more path groups that could be used to transmit the request;

transmitting the first request to the secondary storage system using the first path group, the secondary storage system including a plurality of secondary volumes that are paired to the plurality of primary volumes;

receiving a second request at the primary storage system from the primary host;

identifying a primary volume to which the second request is directed;

determining the priority of the primary volume to which the second request is directed; and assigning the same priority to the second request as the priority of the primary volume to which the second request is directed, wherein the primary storage system includes a path selection table that is accessed to determine the priority of the primary volume, wherein the path selection table associates each of the primary volumes with one or more path groups and the priority.

2. The method of claim 1, further comprising: wherein the first request and the second request are the same request.

3. The method of claim 1, wherein the path group table associates each path group with one or more ports.

4. The method of claim 3, wherein the path group table associates each path group with a given constraint.

5. The method of claim 1, further comprising:
selecting a port from one or more ports associated with the selected path group.

6. The method of claim 1, further comprising:
determining whether or not a constraint defined for the first path group is satisfied;
selecting second path group from the one or more path groups that could be used to transmit the request if the constraint is not satisfied; and
selecting a port from one or more ports associated with the first path group if the constraint is satisfied.

7. The method of claim 6, wherein the first path group is preferred over the second path group in transmitting the first request.

8. A method for handling a remote copy request, the method comprising:

receiving a plurality of requests at a primary storage system from one or more primary hosts, including a first request and a second request, the primary storage system having a plurality of primary volumes, wherein each request is assigned a priority according to the primary volume to which said each request is directed;

sorting the requests according to priority assigned to the requests;

retrieving one of the requests in the order by which the requests have been sorted; and selecting a first path group to be used in transmitting the retrieved request, the first path being selected by accessing a path selection table having information that relates each primary volume to one or more path groups that may be used to transmit the retrieved request thereto, wherein the retrieved request is transmitted to a secondary storage system after the selecting step, the secondary storage system including a plurality of secondary volumes that are paired to the plurality of primary volumes, wherein the path selection table assigns one or more path groups to each of the plurality of primary volumes, wherein the first request is directed to a first primary volume to which a first priority is associated, whereby the first request is assigned to the first priority, wherein the second request is directed to a second primary volume to which a second priority is associated, whereby the second request is assigned to the second priority.

9. The method of claim 8, wherein the path selection table maintains priority information for each of the plurality of primary volumes.

10. A computer program product for handling a remote copy request in a distributed storage system, the computer program, comprising:

a computer readable storage medium having stored thereon computer program code, the computer program code configured to cause a processor to perform steps of:

retrieving a given request from a plurality of requests to be sent to a secondary storage system from a primary storage system, wherein each primary volume is associated with a plurality of priority value, wherein each request received at the primary storage system is assigned a priority value that corresponds to the priority value of the primary volume designated by the request, the retrieved request having equal or higher priority than any remaining requests;

selecting a first path group to be used in transmitting the retrieved request, the first path being selected by accessing a path selection table that provides one or more path groups that may be used to transmit the retrieved request, wherein the path selection table associates each of the primary volumes with one or more path groups and the priority; and transmitting the retrieved request using the selected first path to the secondary storage system, the secondary storage system including a plurality of secondary volumes that are paired to a plurality of primary volumes provided in the primary storage system.

11. A storage system, comprising:

a storage controller to handle remote copy requests received from a host coupled to the storage system via a first network;

a plurality of primary volumes that are paired to a plurality of secondary volumes provided in a remote storage system that is coupled to the storage system via a second network, wherein each primary volume is assigned a priority;

a memory device including a path selection table, the path selection table assigning each of the plurality of primary volumes with one or more path groups that may be used to transmit a request that is associated with a given primary volume; and a computer program including
code for assigning a first request received from the host with a first priority value that corresponds to priority assigned to a first primary volume to which the first request is directed, code for assigning a second request from the host with a second priority value that corresponds to priority assigned to a second primary volume to which the second request is directed, the first priority value being higher than the second priority value, and code for sorting the first and second requests according to their priority values, wherein the first request is placed ahead of the second request in a queue.

12. The storage system of claim 11, wherein the second request is received at the storage system prior to the first request.

13. The storage system of claim 11, wherein the storage controller includes a path group table that maps each of the one or more path groups to one or more ports.

14. The storage system of claim 13, wherein each of the path group listed in the path group table is provided with a constraint that needs to be satisfied in order to use the path group to transmit the request to the remote storage system.

* * * * *